(No Model.)
E. J. GATES.
HOE.
No. 403,655. Patented May 21, 1889.
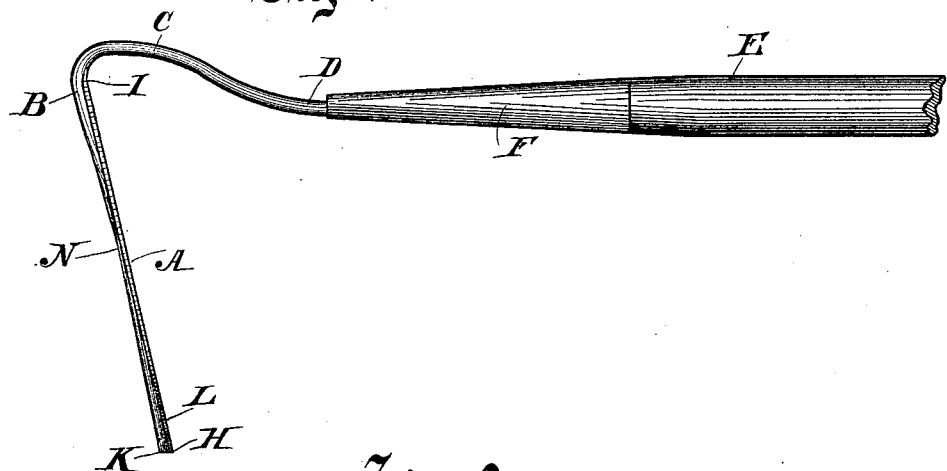
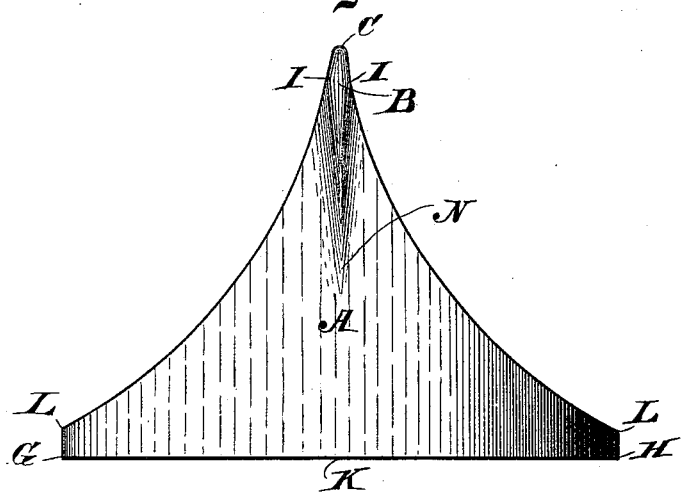
Witnesses.
O. N. Kenney
Anna Faust.
Inventor.
Enathan J. Gates
By Erwin & Benedict
Attorneys.

UNITED STATES PATENT OFFICE.

ELNATHAN J. GATES, OF ORONOCO, MINNESOTA.

HOE.

SPECIFICATION forming part of Letters Patent No. 403,655, dated May 21, 1889.

Application filed August 24, 1888. Serial No. 283,644. (No model.)

*To all whom it may concern:*

Be it known that I, ELNATHAN J. GATES, of Oronoco, in the county of Olmsted and State of Minnesota, have invented a new and useful Hoe; and I do hereby declare the following to be a full, clear, and exact description of said invention, reference being had to the accompanying drawings, and to the letters or figures of reference marked thereon, which form a part of this specification.

My invention, to be hereinafter specifically claimed, relates to that class of hoes which is especially adapted for use in the field or garden for loosening the soil and cutting up weeds.

The object of my invention is to provide a device which shall embody strength and lightness, and which, while its horizontal cutting-edge is of considerable extent and in use will compass considerable ground at each stroke of the hoe, has also as small an amount of surface as possible for receiving and retaining earth thereon, in which manner hoes of ordinary construction are very apt to become clogged and thereby burdened, requiring frequent cleaning, and hence are unsatisfactory in use.

In the drawings, Figure 1 is a side elevation of my improved hoe attached to its handle. Fig. 2 is a front elevation of the same hoe.

The blade A of the hoe is formed integral with the shank B, which shank continues integrally into the neck C and terminates in a tang, D, which enters the end of the handle E. A ferrule, F, is placed on the end of the handle E about its end and about that portion of the tang D that enters the handle E, whereby the connection between them is strengthened and the handle is kept from splitting. The blade A is made somewhat broad laterally, being on its cutting-edge from G to H preferably about seven or seven and one-half inches in length, and is from top to bottom I to K preferably about two-thirds of its width, or about four and one-half inches, the blade being either flat or slightly curved laterally, as shown in the drawings. From the top of the blade at I, where it vanishes into the shank B, the lateral edges of the blade run in an inwardly-curved line downward and outward to the lateral edges of the blade on both sides at L L, which points L L are but a short distance from the line of the cutting-edge of the hoe H G. The part of the blade included between the points G H and L L is also constructed and thereby adapted to provide for the wearing and sharpening of the hoe on its edge, whereby considerable use can be got from the blade before it shall be worn at the edge so that the points G H will be coincident with the points L L.

It will be noticed that the shank B extends down some distance on the blade to the point N, where it vanishes into the blade, as also it vanishes somewhat laterally above that point, by which form of construction of the blade and shank the one is made to strengthen the other, the shank being made to grow thinner and smaller as the blade grows wider downwardly, and the blade being made narrower and vanishes in the shank at I, where the shank is of its full size and strength. By the constant and regular lateral widening of the blade down to the extreme points L L the blade is steadily and uniformly increasingly re-enforced and strengthened in such a way as to obtain the greater strength where it is needed, and lesser strength with the consequent omission of weight, as is desirable, to construct a hoe which is at once sufficiently strong for all practical purposes and which at the same time has no superfluous weight to be a burden to the user, and no unnecessary surface to catch and retain earth, which also becomes a burden to the user. As this blade has so great height and becomes so narrow at its upper edge, terminating in a point at I, and the neck C consists of a single rod, it will be seen that the least possible opportunity is given for the clogging of the hoe by weeds or otherwise.

What I claim as new, and desire to secure by Letters Patent, is—

A hoe consisting of a blade having a long straight or slightly-curved bottom cutting-edge, and side edges curving inwardly upwardly from at or near the bottom to a central integral shank, the height of the blade being about two-thirds of its width, the blade so constructed being narrow both laterally and vertically, in combination with a shank integral with the blade, which shank terminates in a neck and tang adapted to enter a handle, substantially as described.

In testimony whereof I affix my signature in presence of two witnesses.

ELNATHAN J. GATES.

Witnesses:
H. A. ECKHOLDT,
O. G. POPE.